US011976502B2

United States Patent
Matsuda et al.

(10) Patent No.: US 11,976,502 B2
(45) Date of Patent: May 7, 2024

(54) STRIKER FOR MOTOR VEHICLE DOOR

(71) Applicant: MITSUI KINZOKU ACT CORPORATION, Yokohama (JP)

(72) Inventors: Yosuke Matsuda, Yokohama (JP); Tatsuya Takayama, Yokohama (JP)

(73) Assignee: MITSUI KINZOKU ACT CORPORATION, Kanagawa (JP)

(*) Notice: Subject to any disclaimer, the term of this patent is extended or adjusted under 35 U.S.C. 154(b) by 316 days.

(21) Appl. No.: 17/624,115

(22) PCT Filed: Jun. 18, 2020

(86) PCT No.: PCT/JP2020/023919
§ 371 (c)(1),
(2) Date: Dec. 30, 2021

(87) PCT Pub. No.: WO2021/033403
PCT Pub. Date: Feb. 25, 2021

(65) Prior Publication Data
US 2022/0364398 A1 Nov. 17, 2022

(30) Foreign Application Priority Data

Aug. 21, 2019 (JP) .................................. 2019-151504

(51) Int. Cl.
*E05B 85/04* (2014.01)
*B60J 5/04* (2006.01)
*E05B 83/38* (2014.01)

(52) U.S. Cl.
CPC ........... *E05B 85/045* (2013.01); *B60J 5/0479* (2013.01); *E05B 83/38* (2013.01)

(58) Field of Classification Search
CPC .......... E05B 83/00; E05B 83/36; E05B 83/38; E05B 85/00; E05B 85/04; E05B 85/045;
(Continued)

(56) References Cited

U.S. PATENT DOCUMENTS 6,279,218 B1 * 8/2001 Lezuch ................. E05B 85/045
29/271
7,306,269 B2 * 12/2007 Cetnar .................... E05B 77/38
292/216

(Continued)

FOREIGN PATENT DOCUMENTS

| JP | 58-160855 | 10/1983 |
| JP | 2004-148877 | 5/2004 |

(Continued)

OTHER PUBLICATIONS

International Search Report for PCT/JP2020/023919, dated Aug. 4, 2020, 4 pages.

(Continued)

*Primary Examiner* — Nathan Cumar
(74) *Attorney, Agent, or Firm* — NIXON & VANDERHYE

(57) ABSTRACT

A striker on a lower part of a doorway of a vehicle body includes: first and second engagement parts on a metal base and fixed to the vehicle body to be apart from each other to respectively engage with a door latch device on a lower part of a door capable of closing the doorway and a dislocation prevention part adjacent the door latch device; a pair of front and rear engagement pieces on a vehicle interior side of the base respectively opposite the first and second engagement parts; a reinforcing piece between the first and second engagement pieces; and an elastic body fixed to the base by the first and second engagement pieces and the reinforcing piece. The elastic body has a convex portion that abuts against an inner panel of the door when the door is closed. The convex portion is supported by the reinforcing piece.

2 Claims, 6 Drawing Sheets

(58) Field of Classification Search
CPC ... B60J 5/00; B60J 5/047; B60J 5/0477; B60J 5/0479
USPC .................. 292/340, 341.12, 341.13, 341.14
See application file for complete search history.

(56) References Cited

U.S. PATENT DOCUMENTS

| | | | | |
|---|---|---|---|---|
| 8,439,409 | B2* | 5/2013 | Uto ........................... | E05C 3/24 292/216 |
| 8,631,608 | B1* | 1/2014 | Konchan ................ | E05B 77/38 292/341.12 |
| 8,657,349 | B2* | 2/2014 | Konchan ................ | E05B 85/02 292/216 |
| 2004/0056516 | A1* | 3/2004 | Takada ................. | E05B 85/045 296/202 |
| 2007/0114802 | A1* | 5/2007 | Johnson ................. | E05B 77/38 292/340 |
| 2009/0058108 | A1* | 3/2009 | Sawajiri ............... | E05B 85/045 29/512 |
| 2010/0283271 | A1* | 11/2010 | Hemingway .......... | E05B 85/045 292/341.15 |
| 2011/0025078 | A1* | 2/2011 | Gentile ................... | E05B 77/38 292/341.12 |
| 2011/0198872 | A1* | 8/2011 | Gentile ............... | E05B 17/0037 292/341.15 |
| 2011/0316294 | A1* | 12/2011 | Kim ....................... | B62D 25/04 292/340 |
| 2015/0159409 | A1* | 6/2015 | Muramatsu .............. | E05F 7/04 292/195 |

FOREIGN PATENT DOCUMENTS

| | | |
|---|---|---|
| JP | 2009-215745 | 9/2009 |
| JP | 2010-174479 | 8/2010 |
| JP | 4557174 | 10/2010 |
| JP | 2020-026213 | 2/2020 |

OTHER PUBLICATIONS

Written Opinion of the ISA for PCT/JP2020/023919, dated Aug. 4, 2020, 3 pages.

* cited by examiner

STRIKER FOR MOTOR VEHICLE DOOR

This application is the U.S. national phase of International Application No. PCT/JP2020/023919 filed 18 Jun. 2020, which designated the U.S. and claims priority to JP Patent Application No. 2019-151504 filed 21 Aug. 2019, the entire contents of each of which are hereby incorporated by reference.

BACKGROUND OF THE INVENTION

Field of the Invention

The present invention relates to a striker for a motor vehicle door engaging with a door latch device of the motor vehicle door to hold the door in a closed state.

Description of the Related Art

A door coupling structure of a motor vehicle described in JP 4,557,174 B enables a center pillar-less doorway to hold front and rear doors in a closed state, wherein the doors are possible to be opened on both sides.

The door coupling structure described in Patent Literature 1 comprises a striker formed in a loop-like shape provided on a lower portion of a door frame of a vehicle body (referred to as "lower striker" below) and a door latch device that is provided in a lower portion of the door to engage with the lower striker. To prevent the door from entering a vehicle interior side when a lateral crash of a vehicle occurs, this door coupling structure also comprises a male hook that is formed in a J-like shape and provided on the lower portion of the door and a female hook that is provided on the lower portion of the door frame of the vehicle body to engage with the male hook.

However, depending on a displacement form of the lower portion of the door against the vehicle body when a lateral crash of a vehicle occurs, the door coupling structure described in JP 4,557,174 B has a risk that it is broken owing to a load concentration on an engagement portion between the lower striker and the door latch device and that the male hook is deformed.

To solve such a problem, as shown in FIG. 9, a motor-vehicle door latch device 300 described in a previous application by the present applicant (application No. JP 2018-151979) is capable of engaging with a lower striker 100 in which a loop 120 formed in a downward U-like shape and a pin 130 formed with a flange 130a on an upper-end portion thereof are provided on a lower base 110 provided on a lower portion of a door frame so as to be spaced with a predetermined distance in a longitudinal direction. The door latch device 300 is provided with a latch 320 capable of engaging with the loop 120 and an engagement member 330 having a pin entrance groove 330a into which the pin 130 can enter, on a base 310 provided on a lower portion of a door.

Owing to such a formation, when the door is in a closed state, since the latch 320 engages with the loop 120 and the pin 130 enters the pin entrance groove 330a, it is possible to improve a load-bearing property of an engagement portion between the lower striker 100 and the door latch device 300 when a lateral crash of a vehicle occurs, and is possible to prevent the door from entering the vehicle interior side.

SUMMARY OF THE INVENTION

However, the motor-vehicle door latch device described in the previous application is not provided with a member engaging with the pin 130 on the pin entrance groove 330a into which the pin 130 enters. Thus, when the door is in the closed state, the pin 130 is in a state of only entering the pin entrance groove 330a. When the vehicle travels in such a state, owing to vibration, there is a risk that not only an abnormal noise is caused by contact between the pin 130 and the pin entrance groove 330a (referred to as "rattling noise" below), but also the contact portion is broken. Therefore, there is concern about durability.

In view of the above disadvantages, an object of the present invention is to provide a striker for a motor vehicle door of which a rattling noise is prevented and durability is improved, during traveling in a state where a motor vehicle door is closed.

(1) A striker for a motor vehicle door according to the first embodiment of the present invention, that is provided on a lower part of a doorway of a vehicle body to be capable of respectively engaging with a door latch device provided on a lower part of the door capable of closing the doorway and a dislocation prevention part adjacent the door latch device, wherein the striker comprises a base that is made of metal and is fixed to the vehicle body, a first and a second engagement part which are provided on the base to be apart from each other and capable of respectively engaging with the door latch device and the dislocation prevention part, a pair of front and rear engagement pieces which are provided on a vehicle interior side of the base to be respectively opposite to the first and second engagement parts, a reinforcing piece provided between the first and second engagement pieces, and an elastic body fixed to the base by the first and second engagement pieces and the reinforcing piece, wherein the elastic body has a convex portion that abuts against an inner panel of the door when the door is closed, and wherein the convex portion is supported by the reinforcing piece.

According to the striker for a motor vehicle door of the present invention, when the door is closed, the convex portion of the elastic body fixed to the base of the striker is pressed toward a door panel, and therefore it is capable of preventing rattling when the striker is engaged with the door latch, reducing a rattling noise during traveling, and improving durability. Thus, quietness and durability are improved, during traveling in a state where a motor vehicle door is closed.

EMBODIMENTS OF THE INVENTION

The present invention is explained in detail by referring to an embodiment according to the present invention shown in FIGS. 1 to 8 as follows. However, the inventions recited in claims are not limited to the following embodiment. Incidentally, in the following explanation, a direction is explained on the basis of that shown in each drawing.

Figure 1:
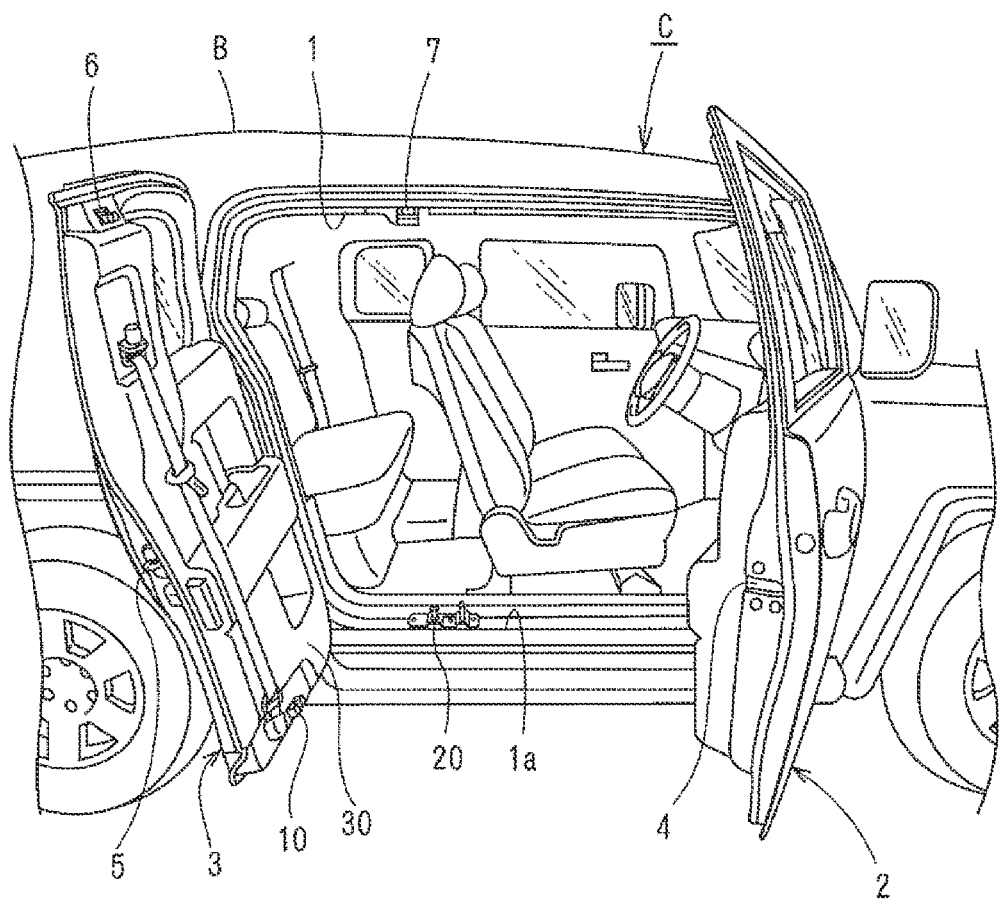
FIG. 1 is a side elevational view showing a vehicle to which the present invention is applied.

As shown in FIG. 1, a vehicle C is formed with a center pillar-less doorway 1 on a side face of a vehicle body B, and front and rear doors 2, 3 are provided in this doorway 1 so as to open on both sides.

The front door 2 is provided with a vertical door hinge (not shown) on a front end thereof so as to be pivotably supported to the vehicle body B, and is capable of opening and closing around the front end. Moreover, the front door 2 is provided with a middle door latch 4 on an internal rear end thereof, and when the rear door 3 is in a closed state, the middle door latch 4 engages with a middle striker 5 that is fixed to a front end surface of the rear door 3 by bolts to hold the front door 2 in a closed state.

The rear door 3 is provided with a vertical door hinge (not shown) on a rear end thereof so as to be pivotably supported to the vehicle body B, and is capable of opening and closing around the rear end. Moreover, the rear door 3 is respectively provided with an upper door latch 6 on an upper front side portion thereof and a door holding mechanism 8 that includes a lower door latch device 10 and is provided on a lower front side portion of an inner panel 30 in a vehicle interior side. The upper door latch 6 engages with an upper striker 7 that is fixed to an upper edge of the doorway 1 of the vehicle body B by bolts while the door holding mechanism 8 engages with a lower striker 20 that is fixed to a lower edge 1a of the doorway 1 of the vehicle body B by bolts, and thus the rear door 3 is held in a closed state.

(Door Holding Mechanism 8)

Figure 2:
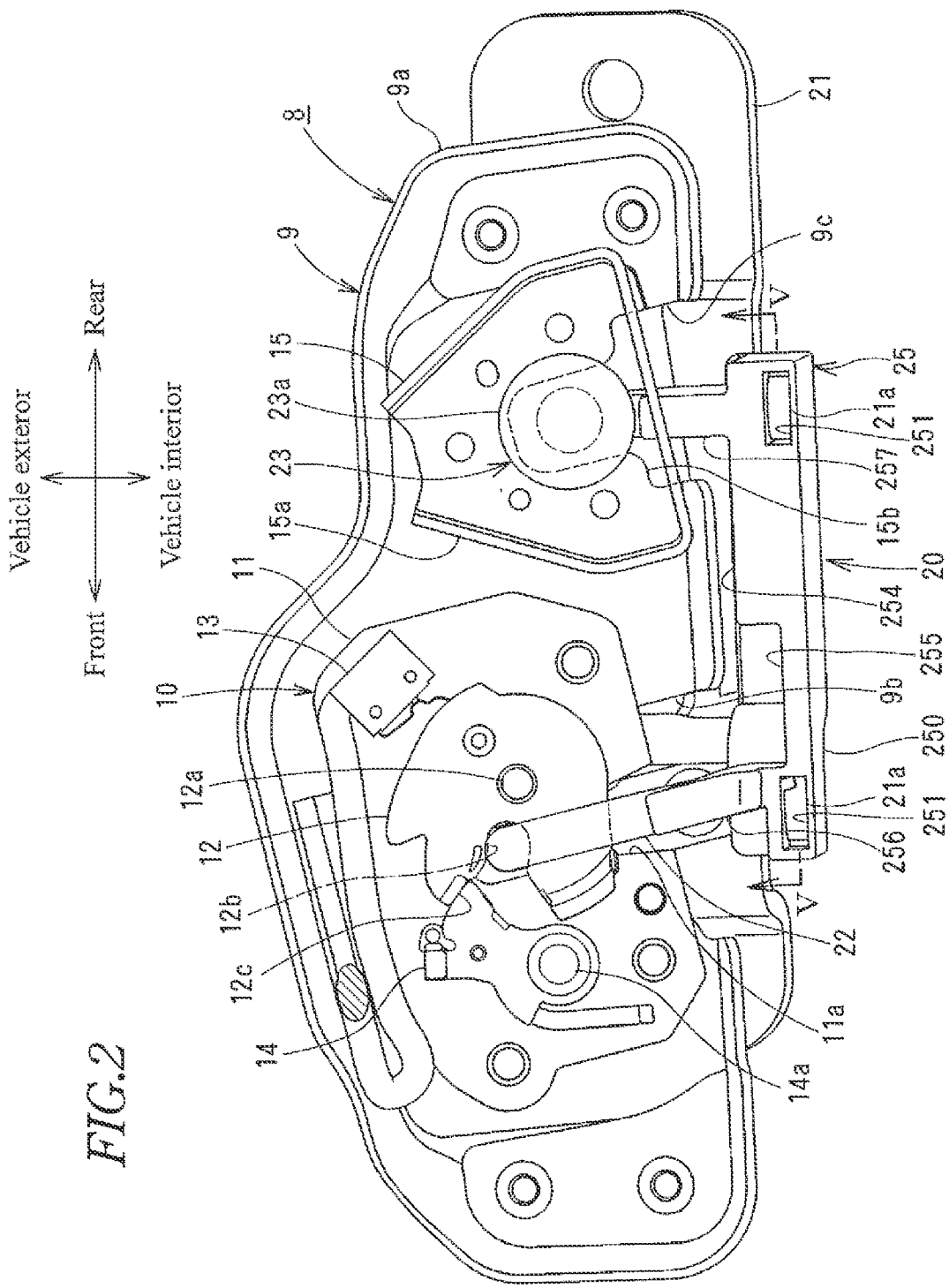
FIG. 2 is a plan view showing an engagement state between a lower striker of the present invention and a door holding mechanism.
Figure 3:
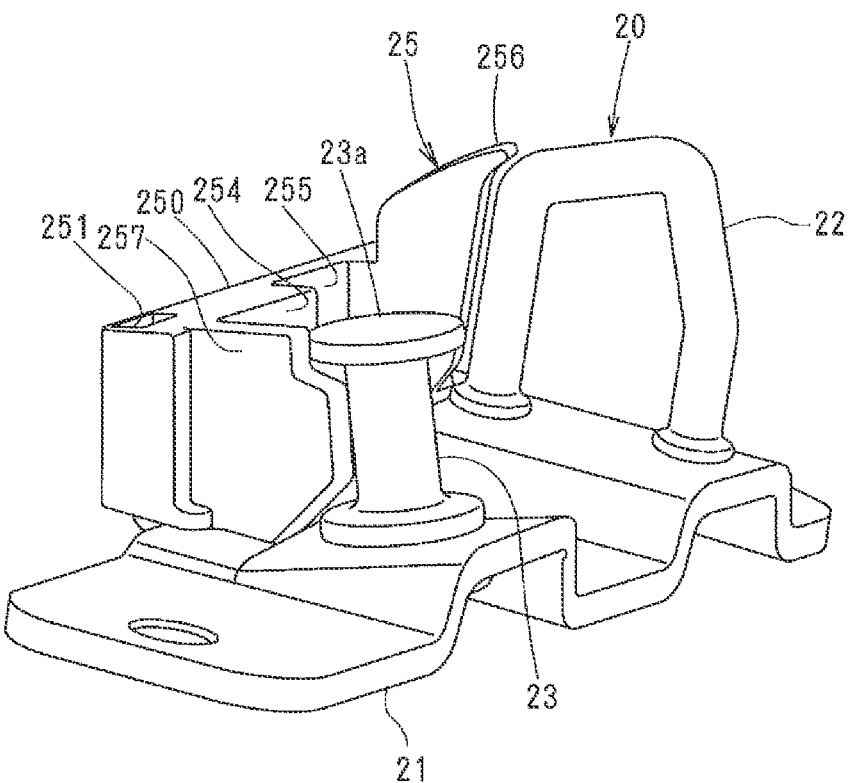
FIG. 3 is a perspective view showing the lower striker.

As shown in FIG. 2, the door holding mechanism 8 comprises a base 9 that is made of a metal plate and is fixed to a lower portion of a wall of the inner panel 30, and the lower door latch device 10 and a dislocation prevention part 15 which are fixed on the base 9 to engage with the lower striker 20.

The base 9 has a reinforced portion 9a that is bent obliquely upward throughout a substantially whole peripheral portion thereof, a first notch portion 9b where a loop 22 that is a first engagement part of the lower striker 20 can enter, and a second notch portion 9c where a pin 23 that is a second engagement part of the lower striker 20 can enter, wherein the first and second notch portions 9b, 9c are formed in a vehicle interior side of the base 9. A formation of the lower striker 20 comprising the loop 22 and the pin 23 is described below.

The lower door latch device 10 comprises a base plate 11 which is made of a metal plate and is fixed to a front side of the base 9, a latch 12 which is pivotably supported to the base plate 11 by a vertical pivoting shaft 12a and with which the loop 22 of the lower striker 20 can engage, a sensor 13 detecting a pivoting position of the latch 12, and a ratchet 14 which is pivotably supported to the base plate 11 by a vertical pivoting shaft 14a and is capable of engaging with the latch 12.

The base plate 11 has a loop entering groove 11a where the loop 22 of the lower striker 20 can enter. This loop entering groove 11a is provided in the base plate 11 such that it overlaps with the first notch portion 9b of the base 9 and that positions of respective openings of the loop entering groove 11a and the first notch portion 9b correspond to each other in the vehicle interior side.

The latch 12 has an engaging groove 12b with which the loop 22 of the lower striker 20 can engage, and an engaged portion 12c which is provided at an opening end side of the engaging groove 12b and with which a tip of the ratchet 14 can engage. Moreover, the latch 12 is pivotable between unlatched and latched positions, wherein the unlatched position is where a position of the opening of the engaging groove 12b overlaps with that of the opening of the loop entering groove 11a of the base plate 11, and the latched position is where these openings are perpendicular to each other.

The ratchet 14 is pivotable between a locked position shown in FIG. 2 and an unlocked position, wherein the latched position is where the ratchet 14 engages with the engaged portion 12c of the latch 12 in the latched position, and the unlocked position is where the ratchet 14 is in a state of disengaging from the engaged portion 12c of the latch 12 by pivoting in a counterclockwise direction in FIG. 2. The ratchet 14 is biased toward the locked position from the unlocked position by a biasing member (not shown) such as a spring.

The dislocation prevention part 15 is made of a metal plate formed in a substantial triangle-like shape and fixed to a rear portion side of the base 9. Moreover, the dislocation prevention part 15 has a reinforced portion 15a that is bent obliquely upward throughout a substantially whole peripheral portion thereof, and a pin entrance groove 15b where the pin 23 of the lower striker 20 can enter. This pin entrance groove 15b is formed such that it overlaps with the second notch portion 9c of the base 9, and that positions of respective openings of the dislocation prevention part 15 and the base 9 correspond to each other in the vehicle interior side. Incidentally, the dislocation prevention part 15 does not have an engagement member for fixing the pin 23 entered the pin entrance groove 15b.

(Lower Striker 20)

As shown in FIGS. 2 to 5, the lower striker 20 is fixed to the lower edge 1a of the doorway 1 of the vehicle body B by bolts (not shown), and comprises a lower base 21 made of a metal plate, the loop (first engagement part) 22 which is made of a metal rod and is formed in a downward U-like shape such that both end portions thereof are fixed to an upper surface of the lower base 21, the pin (second engagement part) 23 which is made of a metal rod standing vertically on the upper surface of the lower base 21 and of which an upper end portion is enlarged to be a flange part 23a, and an elastic stopper 25 which is made of an elastic body such as rubber and is fixed to the lower base 21.

In the present embodiment, as shown in FIG. 2, when the rear door 3 is in the closed state, the loop 22 of the lower striker 20 engages with the latch 12 of the lower door latch device 10 to restrict movement in an opening direction of the rear door 3. Moreover, since the pin 23 enters the pin entrance groove 15b of the dislocation prevention part 15, the flange part 23a having a diameter larger than a width of the pin entrance groove 15b of the dislocation prevention part 15 restricts position aberration in an upward direction of the rear door 3 when a lateral crash of the vehicle and so forth occurs.

Figure 5:
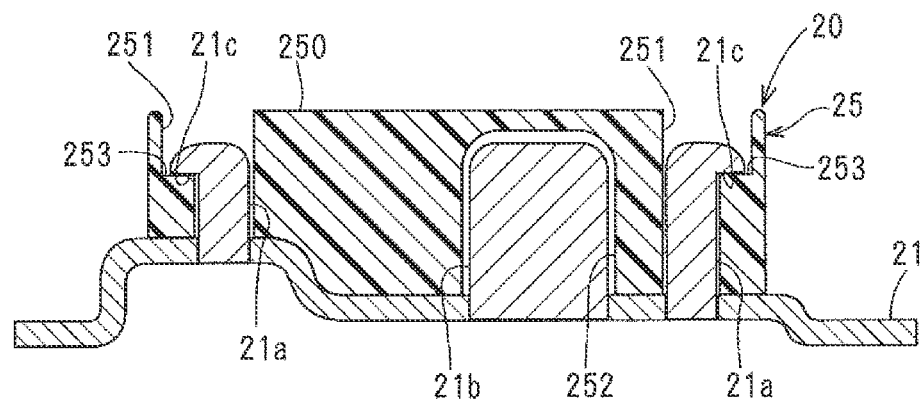
FIG. 5 is an end view taken along the line V-V in FIG. 2.
Figure 6:
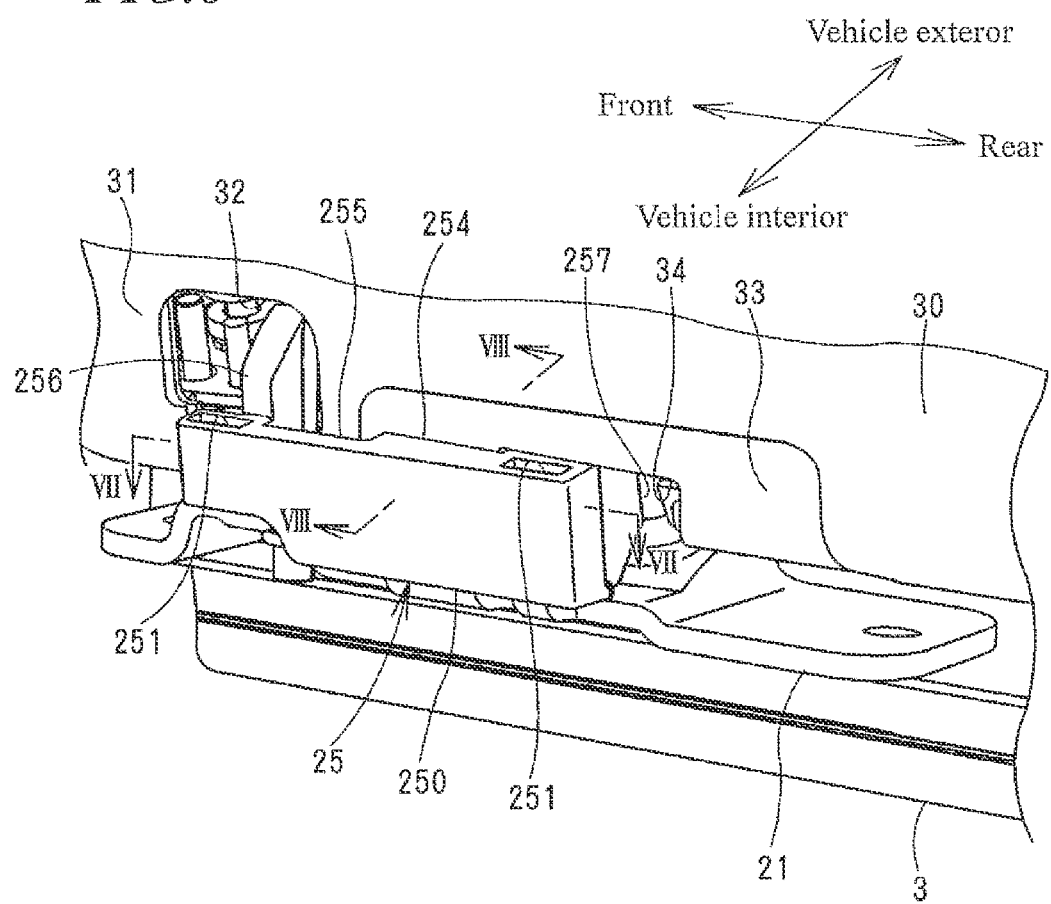
FIG. 6 is a perspective view showing a positional relation between the lower striker and a door panel in the engagement state (door closed state) between the lower striker of the present invention and the door holding mechanism.

As shown in FIGS. 5, 6, and so on, the lower base 21 of the lower striker 20 has front and rear engagement pieces 21a, 21a and a middle reinforcing piece 21b for mounting an elastic stopper 25, wherein these pieces are parts bent upward at a front side portion, a middle portion (slightly rear side), and a rear side portion respectively in the vehicle interior side of the lower base 21. An upper end portion of the front engagement piece 21a is formed with a hooking engagement portion 21c oriented in a front direction and an upper end portion of the rear engagement piece 21a is formed with a hooking engagement portion 21c oriented in a rear direction. The middle reinforcing piece 21b is wider in a longitudinal direction than the front and rear engagement pieces 21a, 21a.

(Elastic Stopper 25)

The elastic stopper 25 comprises;
- a base portion 250 that is fixed to the lower base 21 by inserting the two engagement pieces 21a, 21a and the reinforcing piece 21b of the lower base 21;
- a convex portion 254 that is formed on a surface in the vehicle exterior side of the base portion 250 to project in the vehicle exterior side;
- a depressed portion 255 recessed in the vehicle interior side; and
- a first and a second projecting piece (first and second projecting parts) 256, 257 to project toward the loop 22 and the pin 23 respectively.

The base portion 250 is formed with through holes 251, 251 in the front and rear portions thereof, and the front and rear engagement pieces 21a, 21a of the lower base 21 are respectively inserted into the through holes 251, 251 to go through them vertically. Moreover, the base portion 250 is formed with a supporting hole 252 between the through holes 251, 251, wherein the supporting hole 252 is opened at its bottom and is not opened at its upper end such that the middle reinforcing piece 21b of the lower base 21 is fit into the supporting hole 252 with a slight looseness (alternatively, this hole may be a supporting through hole). As shown in FIG. 5, a step portion 253 is formed inside an upper portion of each of the through holes 251, 251 to be wide in the longitudinal direction such that the hooking engagement portions 21c, 21c of the engagement pieces 21a, 21a entering from below can respectively engage with the step portions 253, 253.

The elastic stopper 25 is fixed to the lower base 21 by the front and rear engagement pieces 21a, 21a of the lower base 21, and the convex portion 254 that abuts against the inner panel 30 when the rear door 3 is closed is pressed toward the inner panel 30 side by the middle reinforcing piece 21b. A width of the convex portion 254 is set to fully provide an abutting area.

Figure 4:
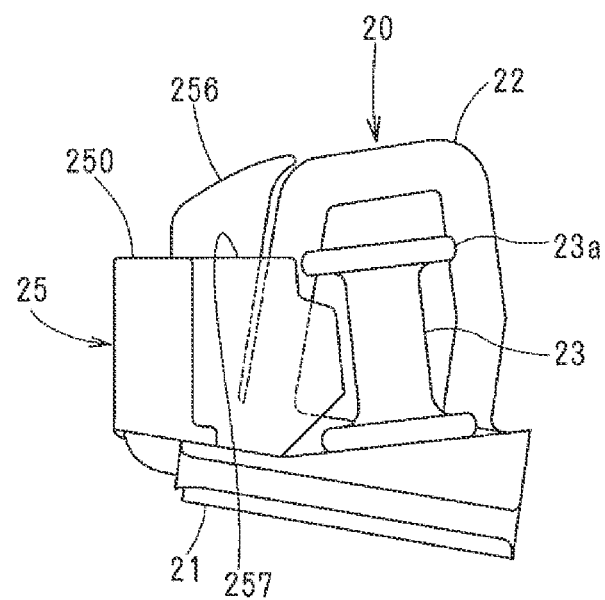
FIG. 4 is a side elevational view showing the lower striker.

As shown in FIG. 4, the first projecting piece 256 of the elastic stopper 25 is formed to be about as high as the loop 22 or slightly higher than the loop 22. Moreover, counter surfaces of the first projecting piece 256 and the loop 22 are complementary to each other, and the first projecting piece 256 projects in the vehicle exterior side such that the counter surfaces are adjacent to each other.

As shown in FIG. 4, the second projecting piece 257 of the elastic stopper 25 is formed to be about as high as the pin 23 or slightly higher than the pin 23. Moreover, counter surfaces of the second projecting piece 257 and the pin 23 are complementary to each other, and the second projecting piece 257 projects in the vehicle exterior side such that the counter surfaces are adjacent to each other.

Namely, the first projecting piece 256 and the loop 22 are spaced with a roughly equal and slight distance through each whole length thereof in a vertical direction, and the same is true in the second projecting piece 257 and the pin 23. Moreover, upper surfaces of the first projecting piece 256 and the loop 22 are roughly continued and roughly smooth without difference in level, and the same is true in the second projecting piece 257 and the pin 23 (flange part 23a).

Accordingly, when an occupant gets on and off through the doorway 1, it is possible to prevent a hem of clothing such as trousers, skirt, and so on from catching on the loop 22 of the lower striker 20 or the pin 23.

(Function of Elastic Stopper 25 when Rear Door 3 is Closed)

Figure 7:
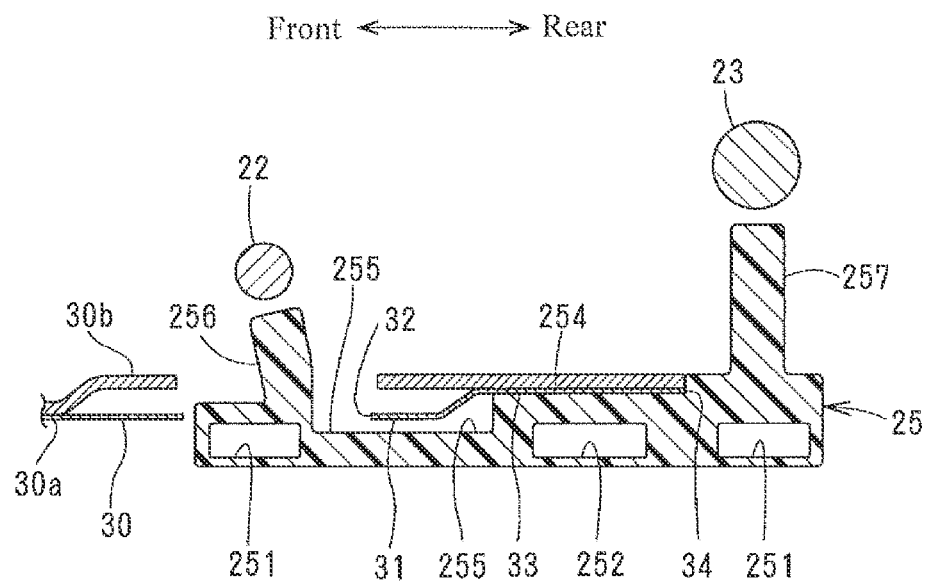
FIG. 7 is an end view taken along the line VII-VII in FIG. 6.
Figure 8:
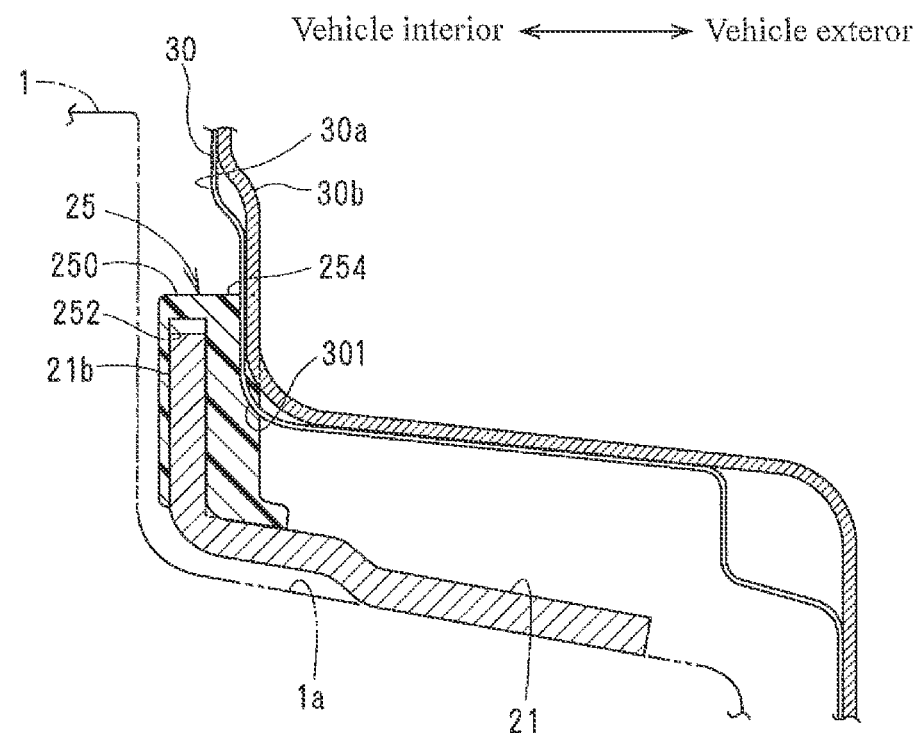
FIG. 8 is an end view taken along the line VIII-VIII in FIG. 6.
Figure 9:
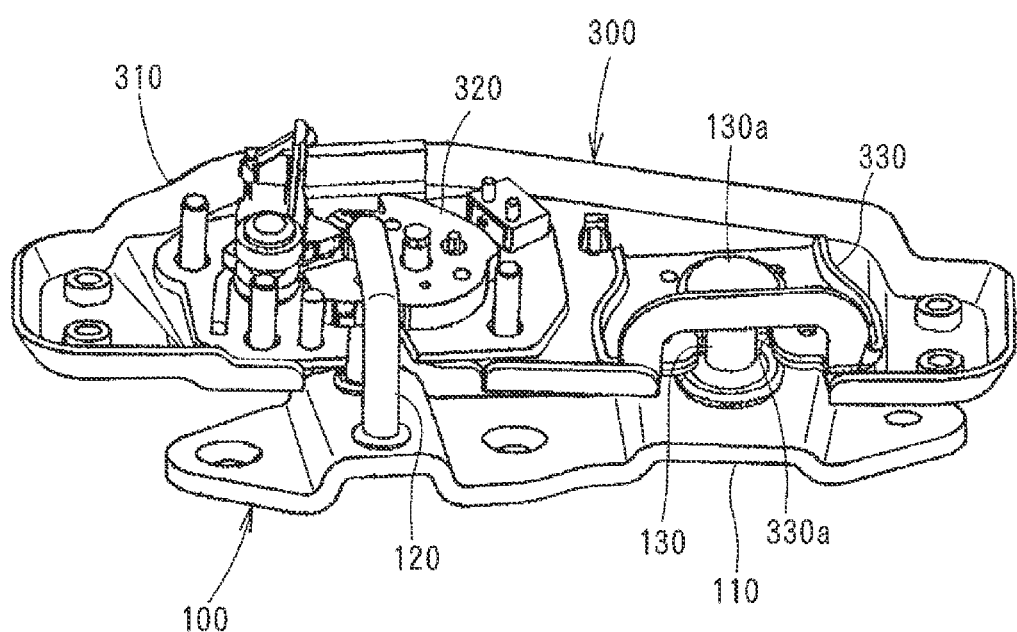
FIG. 9 is a perspective view showing an engagement state between a lower striker and a door holding mechanism of the prior application.

With FIGS. 6 to 8, there is described a function of the lower striker 20, particularly the elastic stopper 25 when the rear door 3 is closed.

As shown in FIGS. 6, 8, when the rear door 3 is in the closed state, the convex portion 254 of the elastic stopper 25 abuts against the lower portion of the inner panel 30 of the rear door 3, wherein the lower portion includes a corner portion 301.

As shown in FIG. 6, the inner panel 30 comprises
- a bulged portion 31 at the lower portion projecting in the vehicle interior side to be opposite to the first projecting piece 256 in the front side of the elastic stopper 25,
- a first opening 32 formed in the bulged portion 31 such that the loop 22 and the first projecting piece 256 can go through when the rear door 3 is closed,
- a depressed portion 33 recessed in the vehicle interior side to be opposite to the second projecting piece 257 in the rear side of the elastic stopper 25, and
- a second opening 34 formed in the depressed portion 33 such that the pin 23 and the second projecting piece 257 can go through when the rear door 3 is closed. Moreover, the inner panel 30 comprises a first panel 30a provided in the vehicle interior side and a reinforcing panel 30b provided in the vehicle exterior side to reinforce the first panel 30a (see FIG. 7).

As shown in FIG. 7, when the rear door 3 is in the closed state, the elastic stopper 25 does not contact the bulged portion 31 of the inner panel 30 owing to the depressed portion 255.

As shown in FIG. 8, when the rear door 3 is in the closed state, the elastic stopper 25 abuts against the depressed portion 33 of the inner panel 30 to the degree that an upper portion of the convex portion 254 elastically deforms. Namely, the convex portion 254 of the elastic stopper 25 is formed such that when the rear door 3 is in the closed state, a surface in the vehicle exterior side of the upper portion of the convex portion 254 is pressed into the vehicle interior side at the degree of a few mm (for example, 3 mm) by abutting against the depressed portion 33 of the inner panel 30.

Incidentally, when the rear door 3 is in an ajar state, the upper portion of the convex portion 254 of the elastic stopper 25 abuts against the depressed portion 33 of the inner panel 30 to elastically deform to a slight degree. Namely, the convex portion 254 of the elastic stopper 25 is formed such that when the rear door 3 is in the ajar state, the surface in the vehicle exterior side of the upper portion of the convex portion 254 is slightly pressed into the vehicle interior side (for example, 0.5 mm) by abutting against the depressed portion 33 of the inner panel 30.

Moreover, the convex portion 254 of the elastic stopper 25 is supported by the wide reinforcing piece 21b with a predetermined counterforce against an external force that is occurred when the convex portion 254 abuts against the inner panel 30, the predetermined counterforce being to the degree that the inner panel 30 is not broken.

As described above, since the elastic stopper 25 is provided on the lower striker 20, when the rear door 3 is in the closed state, the lower striker 20 is fixed by pressing toward the inner panel 30 via the elastic stopper 25, and it is capable of preventing contact between the pin 23 and the pin entrance groove 15b of the dislocation prevention part 15 that is a cause of a rattling noise, preventing breakage of members by such a contact, and improving durability of the members.

What is claimed is:

1. A striker for a motor vehicle door that is provided on a lower part of a doorway of a vehicle body to be capable of respectively engaging with a door latch device provided on a lower part of the door capable of closing the doorway and a dislocation prevention part adjacent the door latch device,
   wherein the striker comprises
   a base that is made of metal and is fixed to the vehicle body,
   a first and a second engagement part which are provided on the base to be apart from each other and capable of respectively engaging with the door latch device and the dislocation prevention part,
   a pair of front and rear engagement pieces which are provided on a vehicle interior side of the base to be respectively opposite to the first and second engagement parts,
   a reinforcing piece provided between the first and second engagement pieces, and
   an elastic body fixed to the base by the first and second engagement pieces and the reinforcing piece,
   wherein the elastic body has a convex portion that abuts against an inner panel of the door when the door is closed, and
   wherein the convex portion is supported by the reinforcing piece.

2. The striker for the motor vehicle door according to claim 1, wherein the elastic body is provided with a first and a second projecting part in a vehicle exterior side, the first and second projecting parts respectively projecting to the first and second engagement parts so as to fill each gap between the elastic body and each of the first and second engagement parts.

* * * * *